US012784574B2

(12) United States Patent
Datta et al.

(10) Patent No.: US 12,784,574 B2
(45) Date of Patent: Nov. 3, 2026

(54) SYSTEMS AND METHODS FOR MITIGATING FALSE ALARMS IN A BUILDING MANAGEMENT SYSTEM

(71) Applicant: Honeywell International Inc., Charlotte, NC (US)

(72) Inventors: Indranil Datta, Bangalore (IN); Jitendra S. Chaurasia, Bengaluru (IN); Mourian Balasubramanian, Bangalore (IN); Jareesh C. Myladan, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 118 days.

(21) Appl. No.: 18/812,442

(22) Filed: Aug. 22, 2024

(65) Prior Publication Data

US 2026/0057764 A1 Feb. 26, 2026

(51) Int. Cl.

| | |
|---|---|
| ***G08B 29/18*** | (2006.01) |
| ***G06N 3/045*** | (2023.01) |
| ***G06N 3/092*** | (2023.01) |

(52) U.S. Cl.

CPC .......... *G08B 29/186* (2013.01); *G06N 3/045* (2023.01); *G06N 3/092* (2023.01)

(58) Field of Classification Search

CPC ....... G08B 29/186; G06N 3/045; G06N 3/092

See application file for complete search history.

(56) References Cited

U.S. PATENT DOCUMENTS

| | | | |
|---|---|---|---|
| 10,666,784 B2 | 5/2020 | Rhoads et al. |
| 10,796,202 B2 | 10/2020 | Gurghian et al. |
| 10,832,563 B2 | 11/2020 | Subramanian et al. |
| 11,282,374 B2 | 3/2022 | Beale et al. |
| 2007/0013776 A1 | 1/2007 | Venetianer et al. |

(Continued)

FOREIGN PATENT DOCUMENTS

| | | |
|---|---|---|
| CN | 101310288 A | 11/2008 |
| CN | 110503610 A | 11/2019 |

(Continued)

OTHER PUBLICATIONS

"Cognitech The Best Before & Aller", Video Enhancement Software, pp. 1-13, May 11, 2022.

(Continued)

*Primary Examiner* — Rufus C Point

(74) *Attorney, Agent, or Firm* — Seager, Tufte & Wickhem, LLP

(57) ABSTRACT

A false alarm Artificial Intelligence (AI) Model is trained using metadata associated with alarms classified as false alarms and a true alarm Artificial Intelligence (AI) Model is trained using metadata associated with alarms classified as true alarms. An incoming alarm is received. The false alarm AI Model and the true alarm AI Model are both applied to the incoming alarm and both models classify the incoming alarm as either a false alarm classification or a true alarm classification. When the false alarm AI model and the true alarm AI Model agree, the incoming alarm is automatically classified accordingly. When the models do not agree, the incoming alarm is presented to an operator console of the BMS, and a manual classification of the incoming alarm is received from the operator console.

20 Claims, 8 Drawing Sheets

(56) References Cited

U.S. PATENT DOCUMENTS

| | | | | |
|---|---|---|---|---|
| 2017/0124855 | A1 | 5/2017 | Kang et al. | |
| 2017/0358201 | A1* | 12/2017 | Govers | G05D 1/0248 |
| 2021/0133607 | A1 | 5/2021 | Stubbs et al. | |
| 2021/0397846 | A1 | 12/2021 | Chang et al. | |
| 2022/0253990 | A1 | 8/2022 | Kumar et al. | |
| 2022/0261958 | A1 | 8/2022 | Akkaraju et al. | |
| 2023/0237897 | A1 | 7/2023 | Tang et al. | |
| 2023/0368336 | A1 | 11/2023 | Datta et al. | |
| 2024/0362544 | A1* | 10/2024 | Brown | G05B 23/0243 |

FOREIGN PATENT DOCUMENTS

| | | | |
|---|---|---|---|
| CN | 113537145 | A | 10/2021 |
| KR | 10-2021-0114169 | A | 9/2021 |
| KR | 10-2340644 | B1 | 12/2021 |
| WO | 2021/035629 | A1 | 3/2021 |

OTHER PUBLICATIONS

"Convolutional Neural Network", Wikipedia, pp. 1-36, Feb. 14, 2022.
"Generative Adversarial Network", Wikipedia, pp. 1-12, Feb. 28, 2022.
"Residual Neural Network", Wikipedia, pp. 1-3, Mar. 17, 2022.
"Video Super-Resolution", Wikipedia, pp. 1-18, Feb. 14, 2022.
Anoosheh et al., "Night-to-Day Image Translation For Retrieval-based Localization", pp. 1-7.2019.
Bhusal et al., "Sok: Modeling Explainablity in Security Monitoring for Trust, Privacy, and Interpretability," 16 pages, Oct. 31, 2022.
Dong et al., "Fast Efficient Algorithm for Enhancement of Low Lighting Video", IEEE, pp. 1-6, 2011.
Dosovitskiy et al., "An Image is Worth 16×16 Words: Transformers for Image Recognition at Scale," Published as a Conference Paper, ICLR 2021, 22 pages.
Dr. Pei-Fen Kuo, "Defining Prediction Varia-bles for Theft Crimes by App-lying Data MiningTechniques", Aug. 12, 2024, 2 pages.
Extended European Search Report, EP Application No. 23170354.7, European Patent Office, Oct. 6, 2023 (12 pgs).
Isola et al., "Image-to-Image Translation With Conditional Adversarial Networks", IEEE, pp. 1125-1134. 2017.
Khatun, M. R., et al., "Data mining technique to analyse and predict crime using crime categories and arrest records", Indonesian Journal of Electrical Engineering and Computer Science, vol. 22, No. 2, May 2021, pp. 1052-1060.
Kim, G., et al., "Deep Illumination-Aware Dehazing With Low-Light and Detail Enhancement," IEEE Transactions on Intelligent Transportation Systems, vol. 23, No. 3, Mar. 2022.
Ledig et al., "Photo-Realistic Single Image Super-Resolution Using a Generative Adversarial Network", IEEE, pp. 4681-4690. 2017.
Lomonaco, V., et al., "Continual Learning for Production Systems", The new "Agile" in the Machine Learning Era, available online at: <https://medium.com/continual-ai/continual-learning-for-production-systems-304cc9f60603#id_token=eyJhbGciOiJSUzl1NilsImtpZC16ljA4YmY1YzM3>, Aug. 24, 2019, 13 pages.
Malav, R., et al., "DHSGAN: An End to End Dehazing Network for Fog and Smoke," Advances in Databases and Information Systems, Springer International Publishing, CHAM, pp. 593-608, XP04750828 [retrieved on May 26, 2019].
Ngo et al., "Improved Color Attenuation Prior For Single-Image Haze Removal", Applied Sciences, pp. 1-22, 2019.
Saurab, CDS Batch 1 Capstone Project Presentations Session, India Institute of Science, https://www.youtube.com/watch?v=9P-CTXKN27A (beginning at time 4:01:41 for GAN). 7 pages, Streamed Live Oct. 22, 2021. Viewed Jul. 13, 2022.
Scylla, "Report on the performance of various modules of Scylla AI Protective Intelligence Suite", 58 pages. (date not available).
Singh, N., et al., "Data Mining for Prevention of Crimes", Human Interface and the Management of Information. Interaction, Visualization, and Analytics, Jun. 7, 2018, pp. 705-716.
Wikipedia, Vision Transformers, 5 pages, Accessed May 23, 2023.
Zeiler et al., "Visualizing And Understanding Convolutional Networks", pp. 818-833, 2014.
Zhu et al., "A Fast Single Image Haze Removal Algorithm Using Color Attenuation Prior", IEEE Transactions on Image Processing, vol. 24, No. 11, pp. 3522-3533, Nov. 2015.

* cited by examiner

SYSTEMS AND METHODS FOR MITIGATING FALSE ALARMS IN A BUILDING MANAGEMENT SYSTEM

TECHNICAL FIELD

The present disclosure relates generally to Building Management Systems, and more particularly to mitigating false alarms in a Building Management System.

BACKGROUND

Building Management Systems are systems that control and/or monitor a building or other facility. Building Management Systems may include, for example, an HVAC system, a security, a video management system, an access control system, a fire system, and/or any other suitable Building Control System. In many cases, a Building Management System raises an alarm when an abnormality is detected in the building and/or an abnormality is detected in the operation of the Building Management System. The alarms must typically be acknowledged and/or otherwise addressed by an operator or other personnel of the building. In some cases, the Building Management System may issue an alarm indicating a potential issue or problem is occurring even though no such issue or problem is actually occurring in the building. These alarms can be referred to as false alarms. When a false alarm occurs, an operator typically needs to respond to the false alarm, which can waste considerable time of the operator and can pull the operator's attention away from actual true alarms. What would be desirable are methods and systems for automatically determining whether an alarm is a false alarm or a true alarm.

SUMMARY

The present disclosure relates generally to Building Management System (BMS) and more particularly to mitigating false alarms in a Building Management System (BMS). An example may be found in a method for mitigating false alarms in a Building Management System (BMS). The illustrative method includes storing a false alarm Artificial Intelligence (AI) Model that is trained using metadata associated with alarms classified as false alarms, and storing a true alarm Artificial Intelligence (AI) Model that is trained using metadata associated with alarms classified as true alarms. An incoming alarm is received. The false alarm AI Model is applied to the incoming alarm and the false alarm AI Model classifies the incoming alarm into either a false alarm classification or a true alarm classification. The true alarm AI Model is also applied to the incoming alarm and the true alarm AI Model classifies the incoming alarm into either the false alarm classification or the true alarm classification. When the false alarm AI Model and the true alarm AI Model both classify the incoming alarm into the false alarm classification, the incoming alarm is automatically classified into the false alarm classification. When the false alarm AI Model and the true alarm AI Model both classify the incoming alarm into the true alarm classification, the incoming alarm is automatically classified into the true alarm classification. When the false alarm AI Model classifies the incoming alarm into the false alarm classification and the true alarm AI Model classifies the incoming alarm into the true alarm classification, the incoming alarm is presented to an operator console of the BMS, and a manual classification of the incoming alarm into either the false alarm classification or the true alarm classification is received from the operator console. In some cases, when the false alarm AI Model classifies the incoming alarm into the true alarm classification and the true alarm AI Model classifies the incoming alarm into the false alarm classification, the incoming alarm is presented to an operator console of the BMS, and a manual classification of the incoming alarm into either the false alarm classification or the true alarm classification is received from the operator console.

Another example may be found in an alarm management system. The alarm management system includes an input, a memory for storing a false alarm Artificial Intelligence (AI) Model and a true alarm Artificial Intelligence (AI) Model, an operator console including a user interface, and a controller that is operatively coupled to the input, the memory and the operator console. The controller is configured to receive from the input an incoming alarm. The controller is configured to apply the false alarm AI Model to the incoming alarm, which classifies the incoming alarm into either a false alarm classification or a true alarm classification. The controller is configured to also apply the true alarm AI Model to the incoming alarm, which classifies the incoming alarm into either the false alarm classification or the true alarm classification. When the false alarm AI Model and the true alarm AI Model both classify the incoming alarm into the false alarm classification, the controller is configured to automatically classify the incoming alarm into the false alarm classification. When the false alarm AI Model and the true alarm AI Model both classify the incoming alarm into the true alarm classification, the controller is configured to automatically classify the incoming alarm into the true alarm classification. When the false alarm AI Model classifies the incoming alarm into the false alarm classification and the true alarm AI Model classifies the incoming alarm into the true alarm classification, the controller is configured to present the incoming alarm on the operator console requesting a manual classification of the incoming alarm into either the false alarm classification or the true alarm classification. In some cases, when the false alarm AI Model classifies the incoming alarm into the true alarm classification and the true alarm AI Model classifies the incoming alarm into the false alarm classification, the controller is configured to present the incoming alarm on the operator console requesting a manual classification of the incoming alarm into either the false alarm classification or the true alarm classification.

Another example may be found in a non-transitory computer readable medium storing instructions thereon. The non-transitory computer readable medium may include any suitable memory such as DRAM, RAM, SRAM, flash memory, solid state memory, hard disk, compact disks, digital video disk, cloud storage and/or any other suitable non-transitory computer readable medium. When the instructions are executed by one or more processors, the one or more processors are caused to receive an incoming alarm. The one or more processors are caused to apply a false alarm AI Model to the incoming alarm, wherein the false alarm AI Model is based on past alarms that were classified into a false alarm classification. The false alarm AI Model classifying the incoming alarm into either the false alarm classification or the true alarm classification. The one or more processors are also caused to apply a true alarm AI Model to the incoming alarm, wherein the true alarm AI Model is based on past alarms that were classified into the true alarm classification. The true alarm AI Model classifying the incoming alarm into either the false alarm classification or the true alarm classification. When the false alarm AI Model and the true alarm AI Model both classify the incoming alarm into the false alarm classification, the one or more processors are caused to automatically classify the incoming alarm into the false alarm classification. When the false alarm AI Model and the true alarm AI Model both classify the incoming alarm into the true alarm classification, automatically classify the incoming alarm into the true alarm classification. When the false alarm AI Model classifies that the incoming alarm into the false alarm classification and the true alarm AI Model classifies that the incoming alarm into the true alarm classification, the one or more processors are caused to present the incoming alarm to an operator console, and to receive from the operator console a manual classification of the incoming alarm into either the false alarm classification or the true alarm classification. In some cases, when the false alarm AI Model classifies that the incoming alarm into the true alarm classification and the true alarm AI Model classifies that the incoming alarm into the false alarm classification, the one or more processors are caused to present the incoming alarm to an operator console, and to receive from the operator console a manual classification of the incoming alarm into either the false alarm classification or the true alarm classification.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
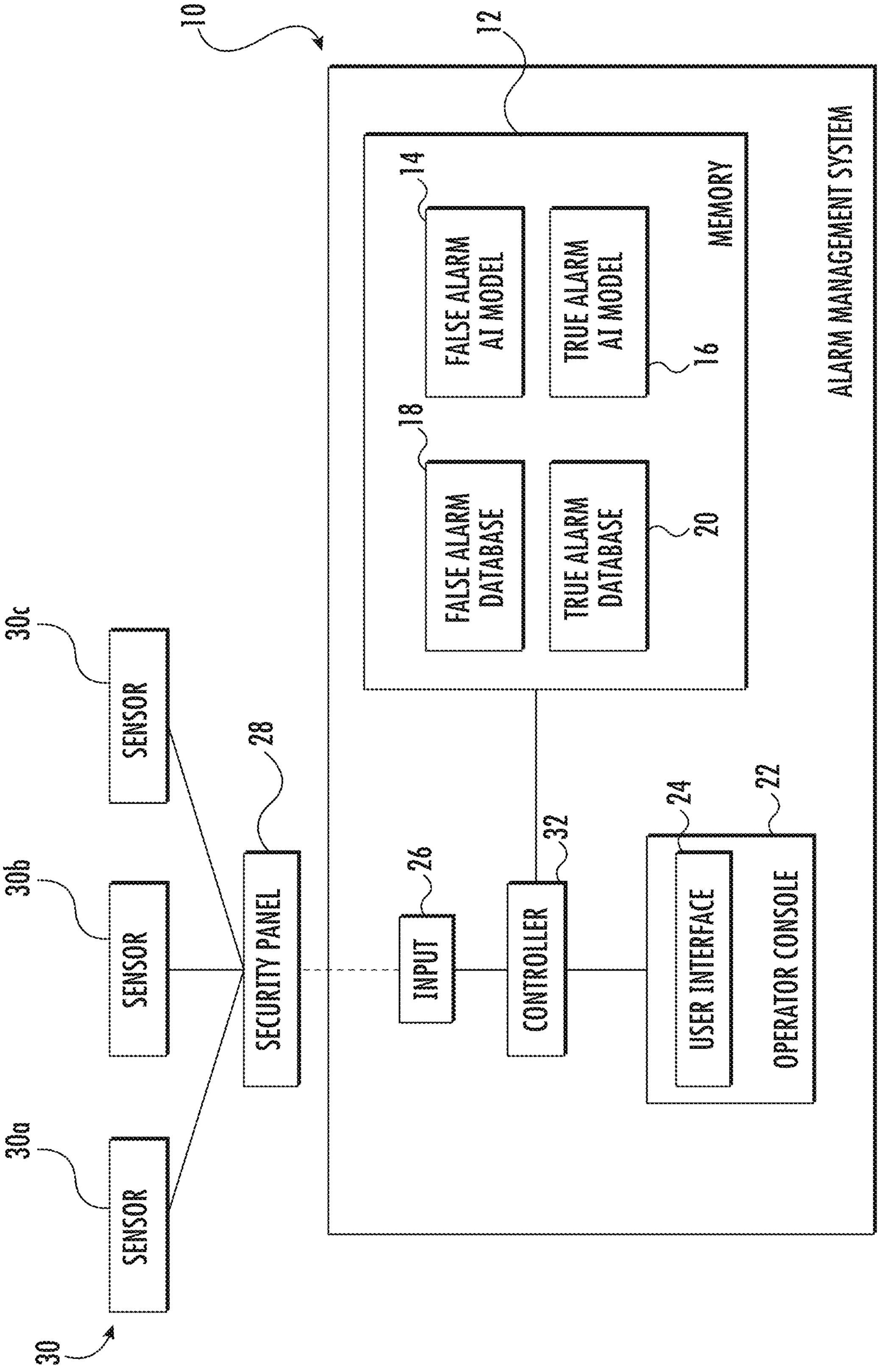
FIG. 1 is a schematic block diagram showing an illustrative alarm management system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative alarm management system 10. The alarm management system 10 may be applied to a Building Management System (BMS), which may include for example an HVAC system, a security and/or access control system, a fire system, and/or any other suitable Building Control System. In some cases, the alarm management system 10 may be applied to an industrial control system, a vehicle control system (e.g. airplane, ship), a power plant control system (coal, nuclear, wind) and/or any other suitable control system as desired.

The illustrative alarm management system 10 includes a memory 12 that stores a false alarm Artificial Intelligence (AI) model 14 and a true alarm Artificial Intelligence (AI) model 16. In some cases, the memory 12 may also store a false alarm database 18 and a true alarm database 20. The false alarm database 18 may store a historical record of alarms that have been classified as false alarms, and the true alarm database 18 may store a historical record of alarms that have been classified as true alarms. The illustrative alarm management system 10 includes an operator console 22 including a user interface 24. The user interface 24 may include a display and a keyboard, for example, or perhaps a display and a touch pad. In some cases, the user interface 24 may include, or may be, a touchscreen display that functions both as a display and as a data entry mechanism. The illustrative alarm management system 10 includes an input 26. In some cases, the input 26 is configured to receive alarms from, for example, a security panel 28 or other controller of a security system. A security system is used here as an example. The security panel 28 receives signals from a number of sensors 30, individually labeled as 30*a*, 30 and 30*c*. There may be tens, hundreds or even thousands of sensors 30. The sensors 30 may include a variety of different sensors 30, such as window open sensors, door open sensors, glass break detectors, motion detectors, fire sensors, smoke sensors, gas sensors and the like. The sensors 30 may include video cameras and associated video analytics algorithms. The sensors 30 may be battery-powered, for example. In some cases, the sensors 30 may communicate directly with the input 26, in which case the security panel 28 may not be present.

The alarm management system 10 may include a controller 32 that is operatively coupled to the input 26, the memory 12 and the operator console 22. The controller 32 is configured to receive an incoming alarm from the input 26. The incoming alarm may be raised by one of the sensors 30 and/or the security panel 28, for example. The controller 32 is configured to apply the false alarm AI Model 14 to the incoming alarm. The false alarm AI Model 14 is trained based on past alarms that were classified as false alarms. The false alarm AI Model 14 classifies the incoming alarm into either a false alarm classification or a true alarm classification. The controller 32 is also configured to apply the true alarm AI Model 16 to the incoming alarm. The true alarm AI Model 16 is trained based on past alarms that were classified as true alarms. The true alarm AI Model 16 classifies the incoming alarm into either the false alarm classification or the true alarm classification. When the false alarm AI Model and the true alarm AI Model both classify the incoming alarm into the false alarm classification, the incoming alarm is automatically classified into the false alarm classification. When the false alarm AI Model 14 and the true alarm AI Model 16 both classify the incoming alarm into the true alarm classification, the incoming alarm is automatically classified into the true alarm classification. When the false alarm AI Model 14 classifies the incoming alarm into the false alarm classification and the true alarm AI Model 16 classifies the incoming alarm into the true alarm classification, the controller 32 is configured to present the incoming alarm on the operator console 22 requesting a manual classification of the incoming alarm into either the false alarm classification or the true alarm classification. In some cases, when the false alarm AI Model 14 classifies the incoming alarm into the true alarm classification and the true alarm AI Model 16 classifies the incoming alarm into the false alarm classification, the controller 32 is configured to present the incoming alarm on the operator console 22 requesting a manual classification of the incoming alarm into either the false alarm classification or the true alarm classification.

In some cases, when the incoming alarm is automatically classified into the false alarm classification, the controller 32 may be configured to not present the incoming alarm on the operator console 22. When the incoming alarm is classified into the false alarm classification, the controller 32 may be configured to add the incoming alarm to the false alarm database 18 and to train and/or retrain the false alarm AI Model 14 using the updated false alarm database 18. When the incoming alarm is classified into the true alarm classification, the controller 32 may be configured to add the incoming alarm to the true alarm database 20 and to train and/or retrain the true alarm AI Model 16 using on the updated true alarm database 20.

In some instances, the controller 32 may be configured to receive via the input 26 an alarm log that includes a log of alarms that includes metadata associated with each of the alarms. The alarm log includes alarms classified into both the false alarm classification and the true alarm classification. The controller 32 may generate and/or update the false alarm database 18 based on the alarms in the alarm log that are classified into the false alarm classification, and may generate and/or update the true alarm database 20 based on the alarms in the alarm log that are classified into the true alarm classification. In some cases, the controller 32 may retrain the false alarm AI Model 14 using the false alarm database 18 as the false alarm database 18 is updated over time. In some cases, the controller 32 may retrain the true alarm AI Model 16 using the true alarm database 20 as the true alarm database 20 is updated over time.

Figure 2A:
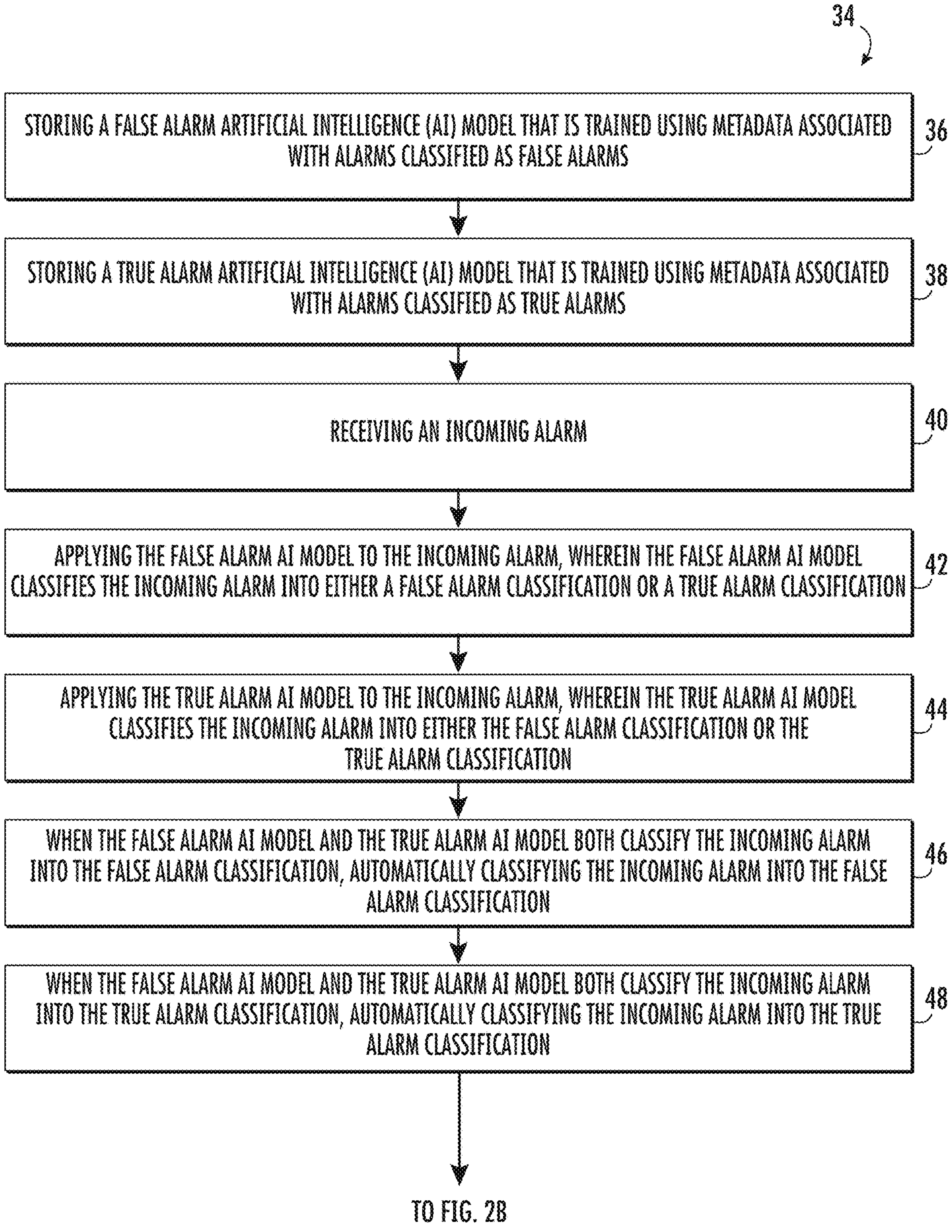
FIGS. 2A, 2B and 2C are flow diagrams that together show an illustrative method for mitigating false alarms using the illustrative alarm management system of FIG. 1.
Figure 2B:
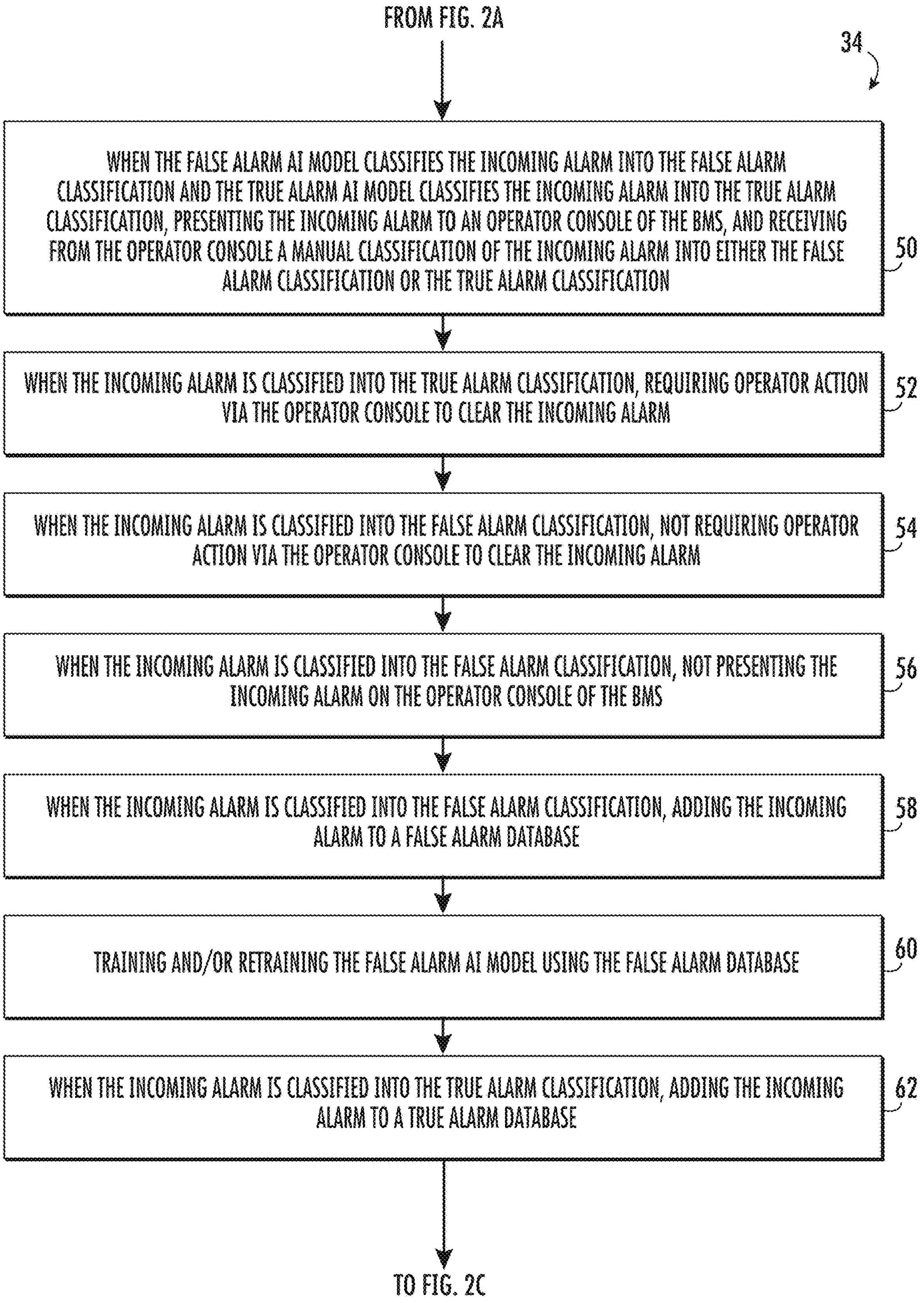
Figure 2C:
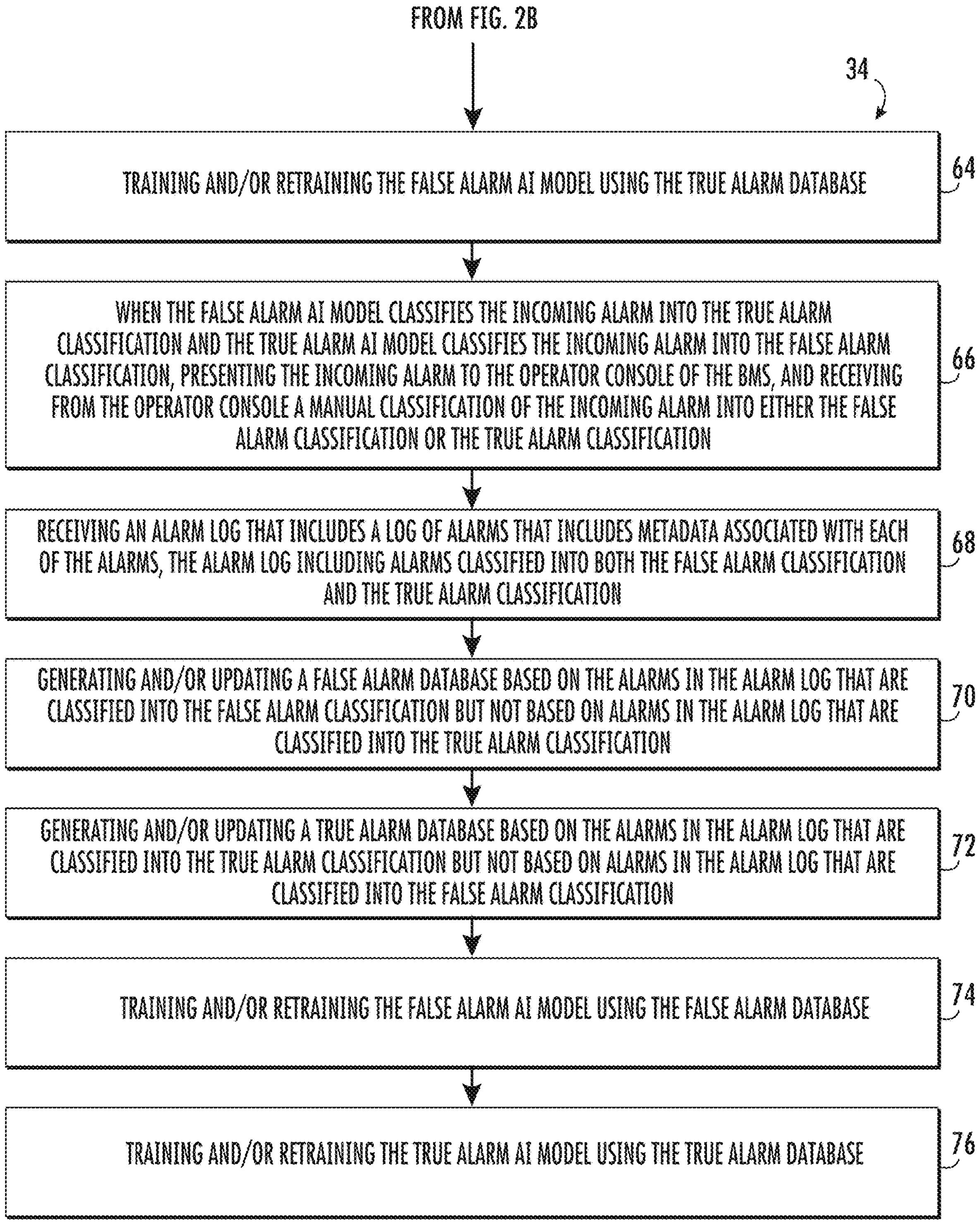

FIGS. 2A, 2B and 2C are flow diagrams that together show an illustrative method 34 for mitigating false alarms in a Building Management System (BMS). A BMS is used as an example. The method 34 includes storing a false alarm Artificial Intelligence (AI) Model (such as the false alarm AI model 14) that is trained using metadata associated with alarms previously classified as false alarms, as indicated at block 36. A true alarm Artificial Intelligence (AI) Model (such as the true alarm AI model 16) that is trained using metadata associated with alarms previously classified as true alarms is stored, as indicated at block 38. In some cases, the false alarm AI model may include either a linear regression based model or a neural network based model. In some cases, the true alarm AI Model may include either a linear regression based model or a neural network based model.

In case of linear regression based model, the model creates a simple regression line (sometimes with a threshold) between inputs and outputs, and coefficients representing the weight of each of the inputs. The linear regression based model may classify an incoming alarm as a false alarm when the incoming alarms falls on one side of the regression line and may classify the incoming alarm as a true alarm when the incoming alarms falls on the opposing side of the regression line. Thus, the use of a linear regression based model provides a direct relationship between the inputs and outputs, which allows for a clear interpretation of how each input influences the output. This provides transparency into why an incoming alarm was classified as a true alarm or a false alarm. This level of transparency into the decision making of the model is not typically present in a neural network based model.

An incoming alarm is received, as indicated at block 40. The false alarm AI Model is applied to the incoming alarm, wherein the false alarm AI Model classifies the incoming alarm into either a false alarm classification or a true alarm classification, as indicated at block 42. The true alarm AI Model is applied to the incoming alarm, wherein the true alarm AI Model classifies the incoming alarm into either the false alarm classification or the true alarm classification, as indicated at block 44. When the false alarm AI Model and the true alarm AI Model both classify the incoming alarm into the false alarm classification, the incoming alarm is automatically classified into the false alarm classification, as indicated at block 46. When the false alarm AI Model and the true alarm AI Model both classify the incoming alarm into the true alarm classification, the incoming alarm is automatically classified into the true alarm classification, as indicated at block 48.

Continuing on FIG. 2B, when the false alarm AI Model classifies the incoming alarm into the false alarm classification and the true alarm AI Model classifies the incoming alarm into the true alarm classification, the incoming alarm is presented to an operator console of the BMS, and a manual classification of the incoming alarm into either the false alarm classification or the true alarm classification is received from the operator console, as indicated at block 50. In some cases, when the incoming alarm is classified into the true alarm classification, operator action via the operator console to clear the incoming alarm may be required, as indicated at block 52. In some cases, when the incoming alarm is classified into the false alarm classification, operator action via the operator console may not be required to clear the incoming alarm, as indicated at block 54. In some cases, when the incoming alarm is classified into the false alarm classification, the incoming alarm is not presented on the operator console of the BMS, as indicated at block 56. In some cases, when the incoming alarm is classified into the false alarm classification, the incoming alarm may be added to a false alarm database, as indicated at block 58. In some cases, the false alarm AI Model may be trained and/or retrained using the false alarm database, as indicated at block 60. In some cases, when the incoming alarm is classified into the true alarm classification, the incoming alarm may be added to a true alarm database, as indicated at block 62.

Continuing on FIG. 2C, in some cases, the true alarm AI Model may be trained and/or retrained using on the true alarm database, as indicated at block 64. When the false alarm AI Model classifies the incoming alarm into the true alarm classification and the true alarm AI Model classifies that the incoming alarm into the false alarm classification, the method 34 may include presenting the incoming alarm to the operator console of the BMS, and receiving from the operator console a manual classification of the incoming alarm into either the false alarm classification or the true alarm classification, as indicated at block 66.

In some cases, the method 34 may include receiving an alarm log that includes a log of alarms that includes meta-data associated with each of the alarms. The alarm log may include alarms classified into both the false alarm classification and the true alarm classification, as indicated at block 68. The false alarm database may be generated and/or updated based on the alarms in the alarm log that are classified into the false alarm classification but not based on alarms in the alarm log that are classified into the true alarm classification, as indicated at block 70. The true alarm database may be generated and/or updated based on the alarms in the alarm log that are classified into the true alarm classification but not based on the alarms in the alarm log that are classified into the false alarm classification, as indicated at block 72. The false alarm AI Model may be trained and/or retrained using the false alarm database, as indicated at block 74. The true alarm AI model may be trained and/or retrained using on the true alarm database, as indicated at block 76.

Figure 3A:
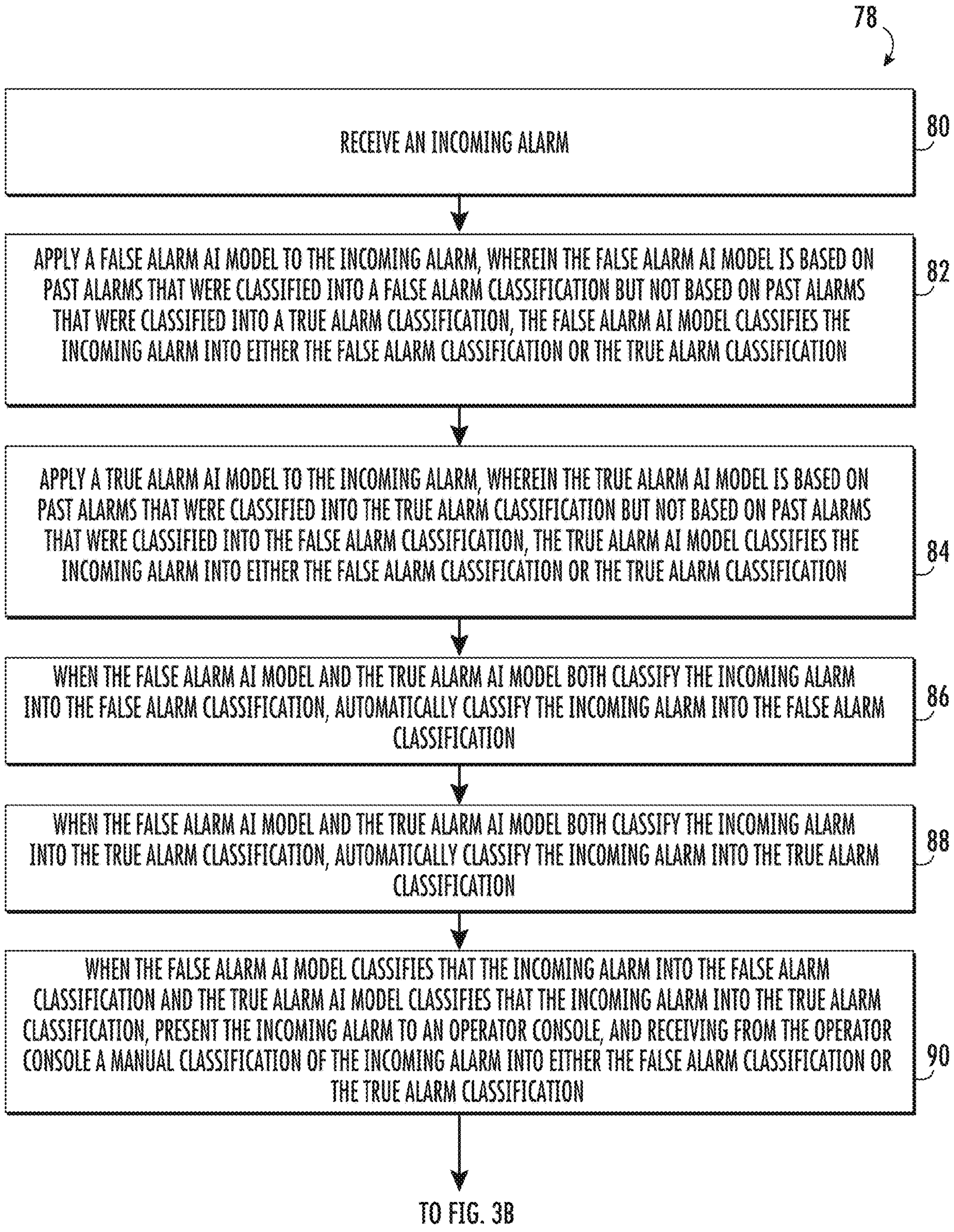
FIGS. 3A and 3B are flow diagrams that together show an illustrative series of steps that may be carried out by one or more processors executing instructions stored on a non-transient, computer readable medium.
Figure 3B:
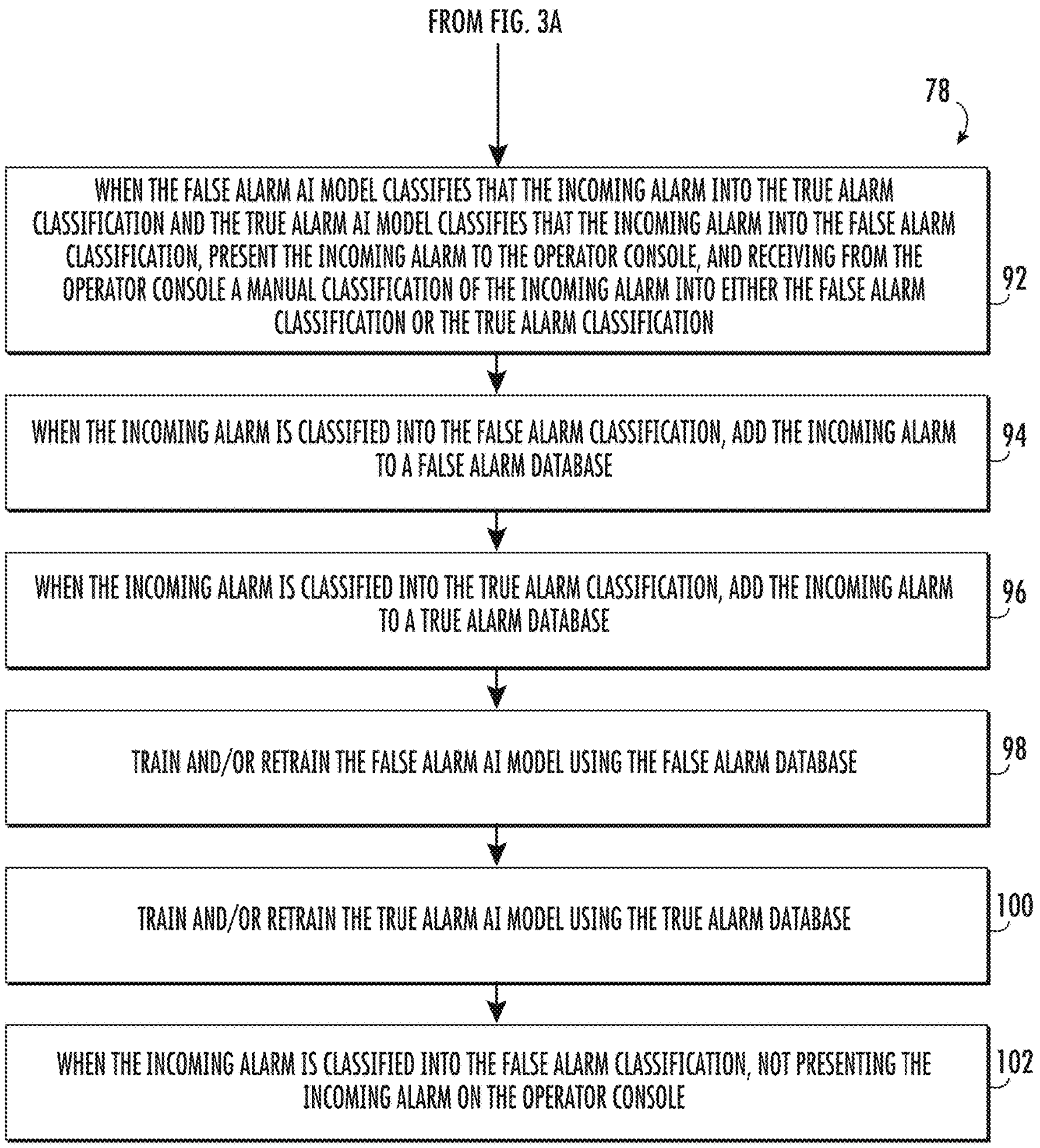

FIGS. 3A and 3B are flow diagrams that together show an illustrative series of steps 78 that may be carried out by one or more processors that are executing instructions stored on a non-transient computer readable medium. The one or more processors may be part of the controller 32, for example. The one or more processors may be caused to receive an incoming alarm, as indicated at block 80. The one or more processors may be caused to apply a false alarm AI Model to the incoming alarm, wherein the false alarm AI Model is based on past alarms that were classified into a false alarm classification. The false alarm AI Model classifies the incoming alarm into either the false alarm classification or the true alarm classification, as indicated at block 82. The one or more processors may be caused to apply a true alarm AI Model to the incoming alarm, wherein the true alarm AI Model is based on past alarms that were classified into the true alarm classification. The true alarm AI Model classifies the incoming alarm into either the false alarm classification or the true alarm classification, as indicated at block 84. When the false alarm AI Model and the true alarm AI Model both classify the incoming alarm into the false alarm classification, the one or more processors may be caused to automatically classify the incoming alarm into the false alarm classification, as indicated at block 86. When the false alarm AI Model and the true alarm AI Model both classify the incoming alarm into the true alarm classification, the one or more processors may be caused to automatically classify the incoming alarm into the true alarm classification, as indicated at block 88. When the false alarm AI Model classifies that the incoming alarm into the false alarm classification and the true alarm AI Model classifies that the incoming alarm into the true alarm classification, the one or more processors may be caused to present the incoming alarm to an operator console, and receiving from the operator console a manual classification of the incoming alarm into either the false alarm classification or the true alarm classification, as indicated at block 90.

Continuing on FIG. 3B, when the false alarm AI Model classifies that the incoming alarm into the true alarm classification and the true alarm AI Model classifies that the incoming alarm into the false alarm classification, present the incoming alarm to the operator console, and receiving from the operator console a manual classification of the incoming alarm into either the false alarm classification or the true alarm classification, as indicated at block 92. In some cases, when the incoming alarm is classified into the false alarm classification, the one or more processors may be caused to add the incoming alarm to a false alarm database, as indicated at block 94. In some cases, when the incoming alarm is classified into the true alarm classification, the one or more processors may be caused to add the incoming alarm to a true alarm database, as indicated at block 96. In some cases, the one or more processors may be caused to train and/or retrain the false alarm AI Model using the false alarm database as the false alarm database is updated over time, as indicated at block 98. In some cases, the one or more processors may be caused to train and/or retrain the true alarm AI Model using on the true alarm database, as the true alarm database is updated over time, as indicated at block 100. In some cases, when the incoming alarm is classified into the false alarm classification, the one or more processors may be caused to not present the incoming alarm on the operator console, as indicated at block 102.

Figure 4:
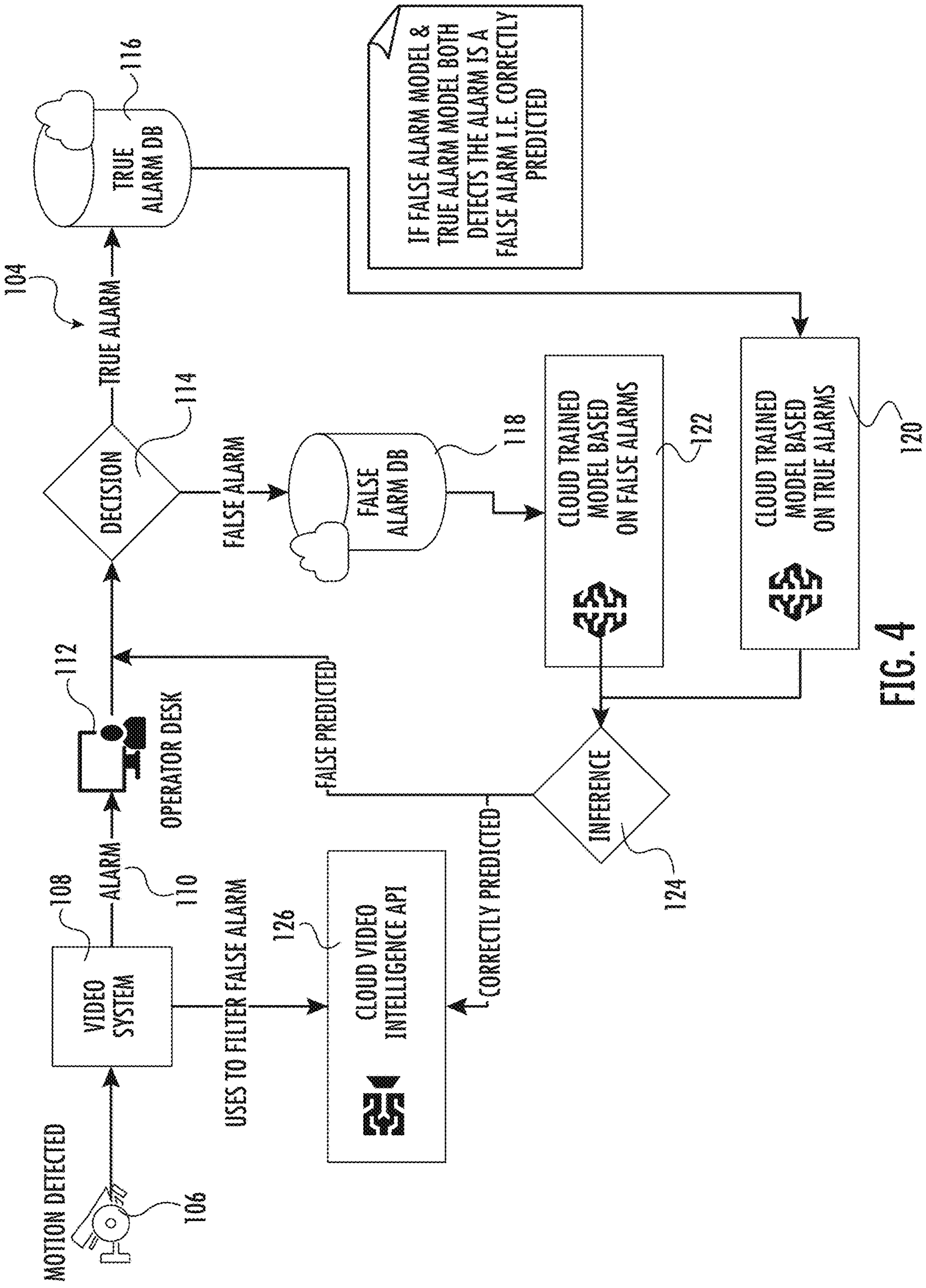
FIG. 4 is a flow diagram showing an illustrative workflow.

FIG. 4 is a flow diagram showing an illustrative workflow 104 in which a video camera 106 captures a video stream and a video stream 108 detects possible movement within that video stream. An alarm 110 is raised, and the alarm 110 passes to an operator desk 112 (which may be considered as being an example of the operator console 22). Initially, the operator at the operator desk may manually classify the alarms as false alarms or true alarms, as show at decision block 114. If a true alarm, the true alarm is stored in a true alarm database 116. If a false alarm, the false alarm is stored within a false alarms database 118.

A true alarm AI model 120 (which may be considered as an example of the true alarm AI model 16) may be trained using the true alarm database 116. A false alarm AI model 122 (which may be considered as an example of the false alarm AI model 14) may be trained using the false alarms database 118. The alarm 110 is processed by the true alarm AI model 120 and the false alarm AI model 122, and each classifies the alarm 110 as either a false alarm or a true alarm and reports the respective classification to an inference block 124.

When the inference block 124 determines that both the true alarm AI model 120 and the false alarm AI model 122 classified the alarm 110 into the same classification (i.e. both classified the alarm 110 as a true alarm or both classified the alarm 110 as a false alarm), then the inference block 124 passes control to API block 126. If both classified the alarm 110 as a true alarm, the alarm is displayed on the operator desk 112. If both classified the alarm 110 as a false alarm, the alarm is filtered out and not displayed on the operator desk 112.

When the inference block 124 determines that the true alarm AI model 120 and the false alarm AI model 122 classified the alarm 110 into the different classification, then the inference block 124 presents the alarm 110 to an operator at the operator desk 112 and request that the operator classify the alarm 110 as either a false alarm or a true alarm, and pass control to the decision block 114. In some cases, an alarm of a certain alarm type may be classified as a false alarm at a first time and may be classified as a true alarm at a second time. For example, one operator may classify an alarm as a false alarm and another operator may classify a similar alarm as a true alarm. Alternatively, one operator may classify an alarm as a false alarm one week and the same operator may classify a similar alarm as a true alarm another week. These situations may cause similar alarms to be in both the true alarm database and the false alarm database, from which the true alarm AI model 120 and the false alarm AI model 122 are trained, respectively. This may cause the true alarm AI model 120 and the false alarm AI model 122 to not agree. When the true alarm AI model 120 and the false alarm AI model 122 do not agree, the system requests that the operator at the operator desk 112 resolve the conflict, and the resolution may be updated in the true alarm database and the false alarm database.

Figure 5:
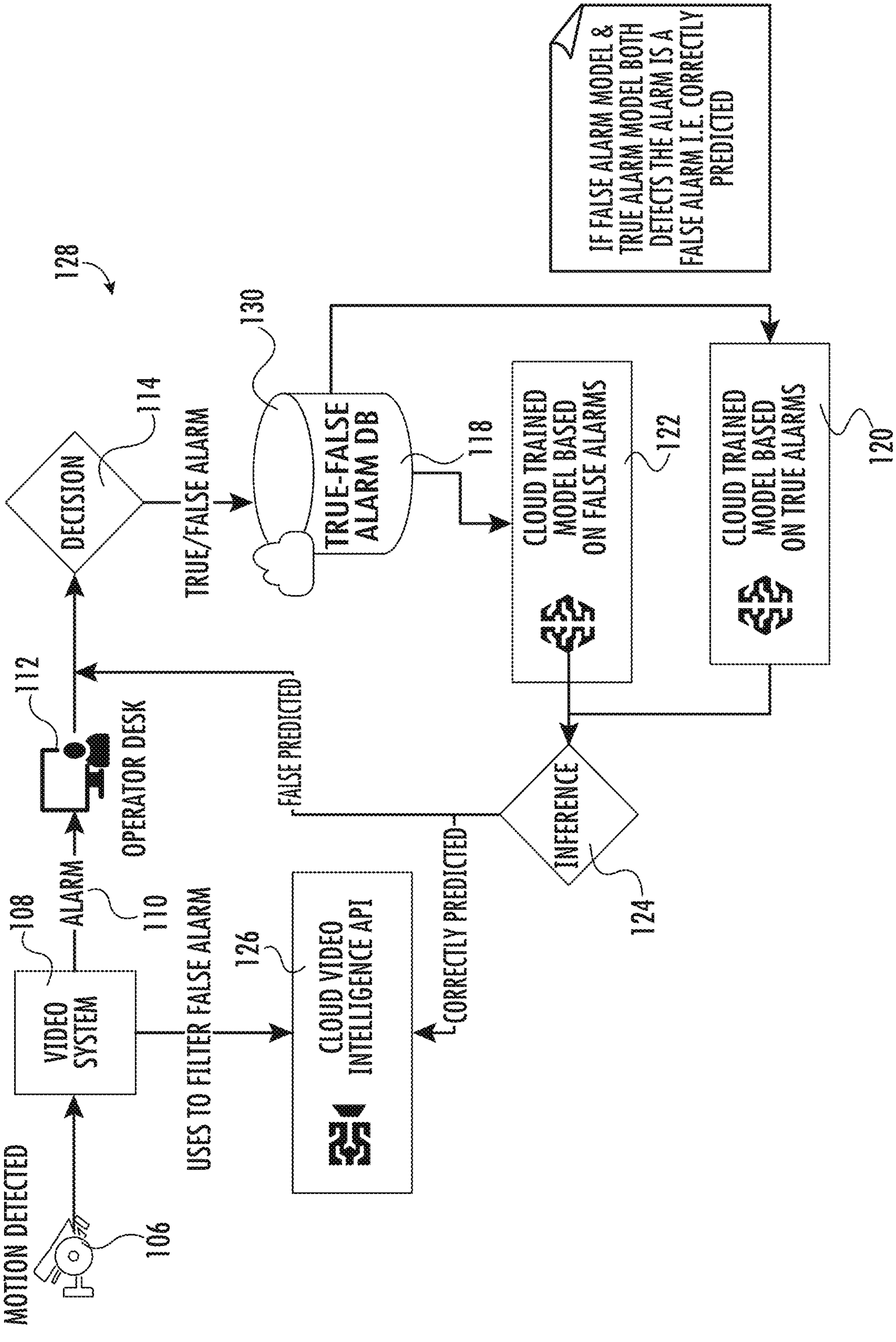
FIG. 5 is a flow diagram showing an illustrative workflow.

FIG. 5 is a flow diagram showing an illustrative workflow 128. The only difference between the workflow 128 and the workflow 104 is that the workflow 128 of FIG. 5 sends both true alarms and false alarms to a common true-false database 130. The true-false database 130 replaces the separate true alarm database 116 and the false alarms database 118 shown for example in FIG. 4. Each alarm in the true-false database 130 is identified as being either a false alarm and a true alarm. This allows the true-false database 130 to be sorted so that the true alarm AI model 120 can be trained using those alarms classified as true alarms and the false alarm AI Model 122 can be trained using the alarms classified as false alarms.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for mitigating false alarms in a Building Management System (BMS), the method comprising:
- storing a false alarm Artificial Intelligence (AI) Model that is trained using metadata associated with alarms classified as false alarms;
- storing a true alarm Artificial Intelligence (AI) Model that is trained using metadata associated with alarms classified as true alarms;
- receiving an incoming alarm;
- applying the false alarm AI Model to the incoming alarm, wherein the false alarm AI Model classifies the incoming alarm into either a false alarm classification or a true alarm classification;
- applying the true alarm AI Model to the incoming alarm, wherein the true alarm AI Model classifies the incoming alarm into either the false alarm classification or the true alarm classification;
- when the false alarm AI Model and the true alarm AI Model both classify the incoming alarm into the false alarm classification, automatically classifying the incoming alarm into the false alarm classification;
- when the false alarm AI Model and the true alarm AI Model both classify the incoming alarm into the true alarm classification, automatically classifying the incoming alarm into the true alarm classification; and
- when the false alarm AI Model classifies that the incoming alarm into the false alarm classification and the true alarm AI Model classifies that the incoming alarm into the true alarm classification, presenting the incoming alarm to an operator console of the BMS, and receiving from the operator console a manual classification of the incoming alarm into either the false alarm classification or the true alarm classification.

2. The method of claim 1, comprising:
- when the incoming alarm is classified into the true alarm classification, requiring operator action via the operator console to clear the incoming alarm.

3. The method of claim 1, comprising:
- when the incoming alarm is classified into the false alarm classification, not requiring operator action via the operator console to clear the incoming alarm.

4. The method of claim 1, comprising:
- when the incoming alarm is classified into the false alarm classification, not presenting the incoming alarm on the operator console of the BMS.

5. The method of claim 1, comprising:
- when the incoming alarm is classified into the false alarm classification, adding the incoming alarm to a false alarm database; and
- training and/or retraining the false alarm AI Model using the false alarm database.

6. The method of claim 1, comprising:
- when the incoming alarm is classified into the true alarm classification, adding the incoming alarm to a true alarm database; and
- training and/or retraining the true alarm AI Model using on the true alarm database.

7. The method of claim 1, wherein the false alarm AI Model and the true alarm AI Model each include one of a linear regression based model or a neural network based model.

8. The method of claim 1, comprising:
- when the false alarm AI Model classifies the incoming alarm into the true alarm classification and the true alarm AI Model classifies the incoming alarm into the false alarm classification, presenting the incoming alarm to the operator console of the BMS, and receiving from the operator console a manual classification of the incoming alarm into either the false alarm classification or the true alarm classification.

9. The method of claim 1, comprising:
- receiving an alarm log that includes a log of alarms that includes metadata associated with each of the alarms, the alarm log including alarms classified into both the false alarm classification and the true alarm classification;
- generating and/or updating a false alarm database based on the alarms in the alarm log that are classified into the false alarm classification but not based on alarms in the alarm log that are classified into the true alarm classification;
- generating and/or updating a true alarm database based on the alarms in the alarm log that are classified into the true alarm classification but not based on the alarms in the alarm log that are classified into the false alarm classification;
- training and/or retraining the false alarm AI Model using the false alarm database; and
- training and/or retraining the true alarm AI Model using on the true alarm database.

10. An alarm management system, comprising:

an input;

a memory for storing a false alarm Artificial Intelligence (AI) Model and a true alarm Artificial Intelligence (AI) Model;

an operator console including a user interface;

a controller operatively coupled to the input, the memory and the operator console, the controller configured to:

receive from the input an incoming alarm;

apply the false alarm AI Model to the incoming alarm to generate a first classification of the incoming alarm, wherein the false alarm AI Model classifies the incoming alarm into either a false alarm classification or a true alarm classification;

apply the true alarm AI Model to the incoming alarm to generate a second classification of the incoming alarm, wherein the true alarm AI Model classifies the incoming alarm into either the false alarm classification or the true alarm classification;

when both the first classification and the second classification indicate the false alarm classification, automatically classify the incoming alarm into the false alarm classification;

when both the first classification and the second classification indicate the true alarm classification, automatically classify the incoming alarm into the true alarm classification; and when the first classification indicates the false alarm classification and the second classification indicates the true alarm classification, present the incoming alarm on the operator console requesting a manual classification of the incoming alarm into either the false alarm classification or the true alarm classification.

11. The alarm management system of claim 10, wherein when the incoming alarm is classified into the false alarm classification, the controller is configured to not present the incoming alarm on the operator console.

12. The alarm management system of claim 10, wherein when the incoming alarm is classified into the false alarm classification, the controller is configured to:

add the incoming alarm to a false alarm database; and train and/or retrain the false alarm AI Model using the false alarm database.

13. The alarm management system of claim 10, wherein when the incoming alarm is classified into the true alarm classification, the controller is configured to:

add the incoming alarm to a true alarm database; and train and/or retrain the true alarm AI Model using on the true alarm database.

14. The alarm management system of claim 10, wherein:

when the incoming alarm is classified into the false alarm classification, the controller is configured to add the incoming alarm to a false alarm database;

when the incoming alarm is classified into the true alarm classification, the controller is configured to add the incoming alarm to a true alarm database; and the controller is configured to train and/or retrain the false alarm AI Model using the false alarm database and train and/or retrain the true alarm AI Model using on the true alarm database.

15. The alarm management system of claim 10, wherein:

when the first classification indicates the true alarm classification and the second classification indicates the false alarm classification, the controller is configured to present the incoming alarm to the operator console, and receive from the operator console a manual classification of the incoming alarm into either the false alarm classification or the true alarm classification.

16. The alarm management system of claim 10, wherein the controller is configured to:

receive via the input an alarm log that includes a log of alarms that includes metadata associated with each of the alarms, the alarm log including alarms classified into both the false alarm classification and the true alarm classification;

generate and/or update a false alarm database based on the alarms in the alarm log that are classified into the false alarm classification but not based on alarms in the alarm log that are classified into the true alarm classification;

generate and/or update a true alarm database based on the alarms in the alarm log that are classified into the true alarm classification but not based on the alarms in the alarm log that are classified into the false alarm classification;

train and/or retrain the false alarm AI Model using the false alarm database; and train and/or retrain the true alarm AI Model using the true alarm database.

17. A non-transitory computer readable medium storing instructions thereon that when executed by one or more processors causes the one or more processors to:

receive an incoming alarm;

apply a false alarm AI Model to the incoming alarm, wherein the false alarm AI Model is based on past alarms that were classified into a false alarm classification but not based on past alarms that were classified into a true alarm classification, the false alarm AI Model classifies the incoming alarm into either the false alarm classification or the true alarm classification;

apply a true alarm AI Model to the incoming alarm, wherein the true alarm AI Model is based on past alarms that were classified into the true alarm classification but not based on past alarms that were classified into the false alarm classification, the true alarm AI Model classifies the incoming alarm into either the false alarm classification or the true alarm classification;

when the false alarm AI Model and the true alarm AI Model both classify the incoming alarm into the false alarm classification, automatically classify the incoming alarm into the false alarm classification;

when the false alarm AI Model and the true alarm AI Model both classify the incoming alarm into the true alarm classification, automatically classify the incoming alarm into the true alarm classification; and when the false alarm AI Model classifies that the incoming alarm into the false alarm classification and the true alarm AI Model classifies that the incoming alarm into the true alarm classification, present the incoming alarm to an operator console, and receiving from the operator console a manual classification of the incoming alarm into either the false alarm classification or the true alarm classification.

18. The non-transitory computer readable medium of claim 17, wherein the instructions cause the one or more processors to:

when the false alarm AI Model classifies that the incoming alarm into the true alarm classification and the true alarm AI Model classifies that the incoming alarm into the false alarm classification, present the incoming alarm to the operator console, and receiving from the operator console a manual classification of the incoming alarm into either the false alarm classification or the true alarm classification.

19. The non-transitory computer readable medium of claim 17, wherein the instructions cause the one or more processors to:

when the incoming alarm is classified into the false alarm classification, add the incoming alarm to a false alarm database;

when the incoming alarm is classified into the true alarm classification, add the incoming alarm to a true alarm database;

train and/or retrain the false alarm AI Model using the false alarm database; and train and/or retrain the true alarm AI Model using on the true alarm database.

20. The non-transitory computer readable medium of claim 17, wherein the instructions cause the one or more processors to:

when the incoming alarm is classified into the false alarm classification, not presenting the incoming alarm on the operator console.

* * * * *